(12) United States Patent
Brenden et al.

(10) Patent No.: US 12,475,926 B1
(45) Date of Patent: Nov. 18, 2025

(54) SWITCHABLE INDUCTOR FOR BOOST OR MATCHING OPTIMIZATION

(71) Applicant: Avago Technologies International Sales Pte. Limited, Singapore (SG)

(72) Inventors: Jason Paul Brenden, Lake Elmo, MN (US); Junqi Hua, Lakeville, MN (US); Cameron Carroll Rabe, Inver Grove Heights, MN (US); Jeffrey A. Gleason, Burnsville, MN (US); Paul Mark Mazur, Cottage Grove, MN (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/934,693

(22) Filed: Nov. 1, 2024

(51) Int. Cl.
*G11B 20/10* (2006.01)
*G11B 5/02* (2006.01)

(52) U.S. Cl.
CPC ........ *G11B 20/10481* (2013.01); *G11B 5/022* (2013.01); *G11B 20/10027* (2013.01); *G11B 2220/2516* (2013.01)

(58) Field of Classification Search
None
See application file for complete search history.

(56) References Cited

U.S. PATENT DOCUMENTS

| | | | | |
|---|---|---|---|---|
| 3,394,234 A | * | 7/1968 | Grace | G11B 5/02 333/32 |
| 5,424,626 A | * | 6/1995 | Roberts | G11B 5/3116 323/356 |
| 5,737,154 A | * | 4/1998 | Kumagai | G11B 15/125 |
| 5,801,531 A | * | 9/1998 | Viches | G11B 33/10 369/222 |
| 5,986,832 A | * | 11/1999 | Barnett | G11B 5/022 |
| 6,040,954 A | * | 3/2000 | Tanghe | G11B 5/022 360/68 |
| 6,683,487 B2 | * | 1/2004 | Takeuchi | H03K 17/6872 327/423 |
| 7,375,909 B2 | | 5/2008 | Venca et al. | |
| 12,159,648 B1 | * | 12/2024 | Teng | G11B 20/10342 |
| 2005/0094306 A1 | | 5/2005 | Takeuchi | |
| 2005/0237785 A1 | | 10/2005 | Venca et al. | |

(Continued)

OTHER PUBLICATIONS

Yoo, Sang-Sun, et al., "Optimazation of Switchable Inductor and Application to Reconfigurable LNA with Self-matched Capacitor", Proceedings of Asia-Pacific Microwave Conference 2007, 1-4244-0749-4/07/$20.00 @2007 IEEE, 4 pages.

*Primary Examiner* — Peter Vincent Agustin
(74) *Attorney, Agent, or Firm* — Quarles & Brady LLP

(57) ABSTRACT

A module including first and second variable inductances. The first variable inductance is electrically connected to a pair of nodes in a first half-circuit. One of the nodes in the first half-circuit is a first connection terminal. The second variable inductance is electrically connected to a pair of nodes in a second half-circuit. One of the nodes in the second half-circuit is a second connection terminal. The first half-circuit receives a flow of current in response to the second half-circuit supplying the current to the load in a flow direction from a load through the first connection terminal. The second half-circuit is configured to receive the flow of the current in response to the first half-circuit supplying the current to the load in a direction opposite to the flow direction from the load through the second connection terminal.

20 Claims, 9 Drawing Sheets

(56) References Cited

U.S. PATENT DOCUMENTS

| | | |
|---|---|---|
| 2008/0106349 A1 | 5/2008 | McKinzie |
| 2010/0061005 A1* | 3/2010 | Contreras ................ G11B 5/09 |
| | | 326/30 |
| 2023/0246624 A1 | 8/2023 | Rangineni et al. |

* cited by examiner

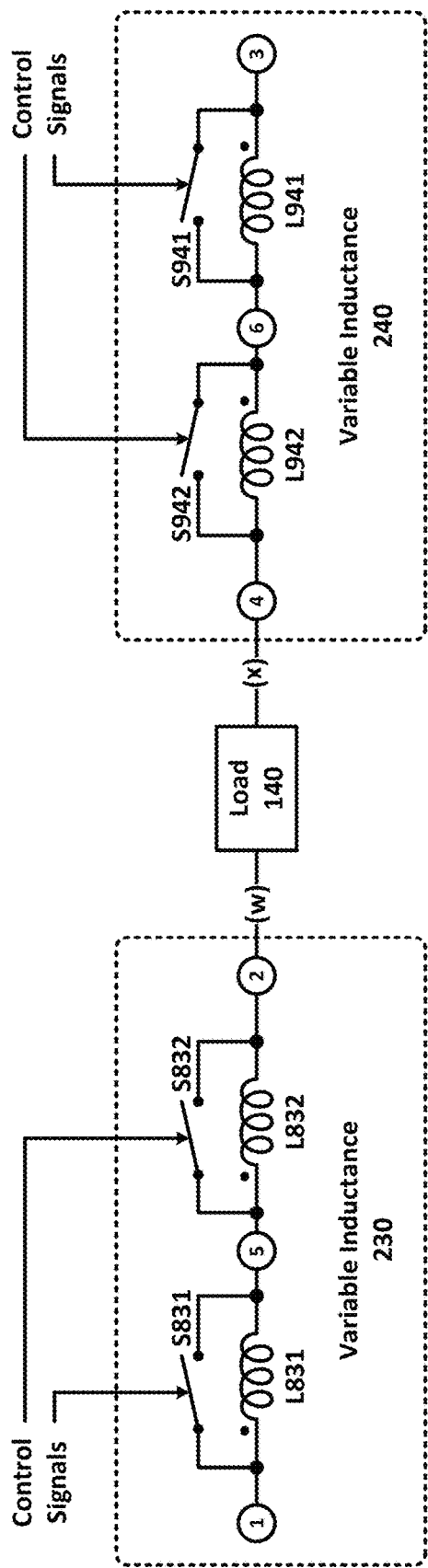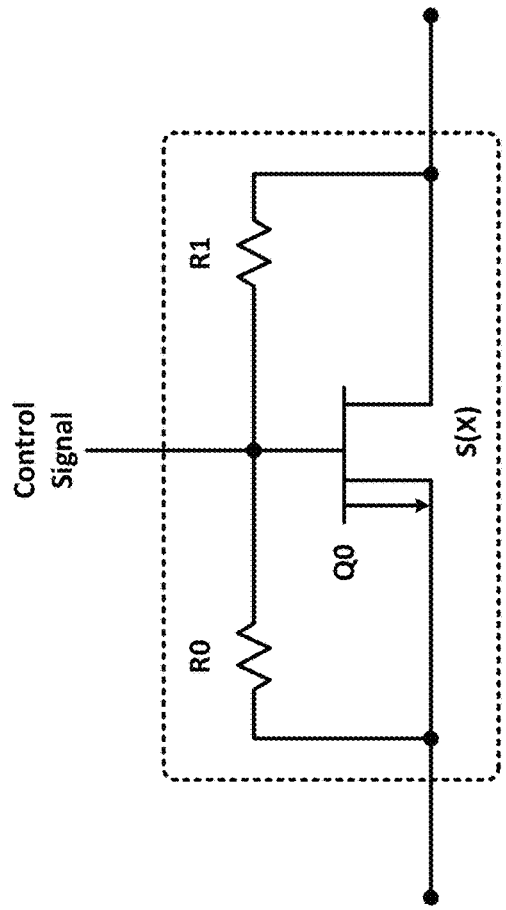
FIG. 10
FIG. 11

SWITCHABLE INDUCTOR FOR BOOST OR MATCHING OPTIMIZATION

BACKGROUND

Hard disk drive (HDD) write drivers are electronic circuits responsible for converting digital data into current during the recording of data. An HDD write driver can control the current sent to a write head of a disk drive. Magnetic signals resulting from the current are written onto disk platters by the write head during the data recording.

BRIEF DESCRIPTION OF DRAWINGS

The accompanying drawings, which are incorporated in and form a part of this specification, illustrate examples of the disclosure and, together with the description, explain principles of the examples.

FIG. 10 illustrates exemplary variable inductances, in accordance with one or more embodiments of the disclosure.

FIG. 11 illustrates an exemplary switch, in accordance with one or more embodiments of the disclosure.

Figure 1:
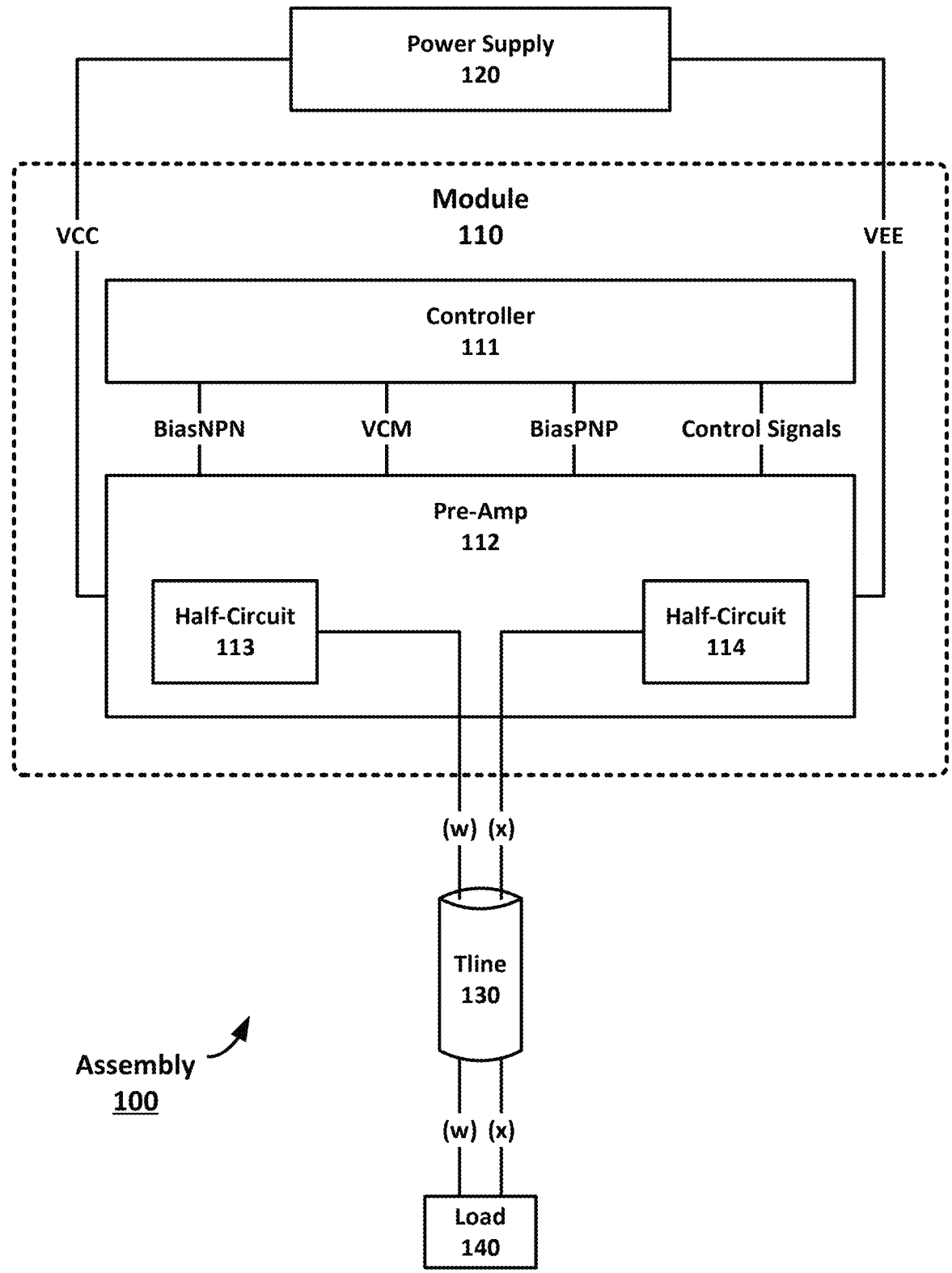
FIG. 1 illustrates an exemplary assembly, in accordance with one or more embodiments of the disclosure.

In the drawings, like reference symbols and numerals indicate the same or similar components. Like elements in the various figures are denoted by like reference symbols and numerals for consistency. Unless otherwise indicated, like elements and method steps are referred to with like reference numerals.

DETAILED DESCRIPTION OF THE INVENTION

The following describes technical solutions in this specification with reference to the accompanying drawings. Exemplary embodiments are described in detail with reference to the accompanying drawings.

The terminology used herein is for describing various examples only, and is not to be used to limit the disclosure. Unless otherwise defined, all terms, including technical and scientific terms, used herein have the same meaning as commonly understood by one of ordinary skill in the art to which this disclosure pertains and after an understanding of the disclosure of this application.

Terms, such as those defined in commonly used dictionaries, are to be interpreted as having a meaning that is consistent with their meaning in the context of the relevant art and the disclosure of this application. Although the present technology has been described by referring to certain examples, workers skilled in the art will recognize that changes may be made in form and detail without departing from the scope of the discussion.

As data rates continue to increase, it is more important to have good high frequency impedance matching as well as fast rise times in HDD write drivers. Because the data spans a large range of frequencies, it is desirable to get good impedance matching across a broad range of frequencies. Most of the parasitic capacitance on the driver circuit is contributed by the driver devices, usually made out of large bipolar transistors. Accordingly, there is a need in the art for an improved write driver.

Referring to FIG. 1, assembly 100 is illustrated. Assembly 100 may include module 110, power supply 120, flexible circuit tline 130 and load 140. Those skilled in the art will appreciate there may be additional components in assembly 100.

Power supply 120 may convert power from an external power source into supply voltages VCC and VEE. Power supply 120 may output, to module 110, supply voltage VCC at a positive direct current (DC) voltage and supply voltage VEE at a constant negative DC voltage despite any fluctuation in load conditions on module 110 caused by tline 130 and load 140.

Tline 130 may be implemented as a group of individual cables or wires that are bound together. Tline 130 may comprise multiple strands of wires. In some implementations, tline 130 may be a flexible interconnect cable.

Load 140 is an impedance that module 110 may happen to be driving. For example, load 140 may be an electronic component, an electronic circuit, an electronic device, and/ or any device that consumes electrical power. In some implementations, load 140 may be a read/write head in a hard disc drive.

Figure 2:
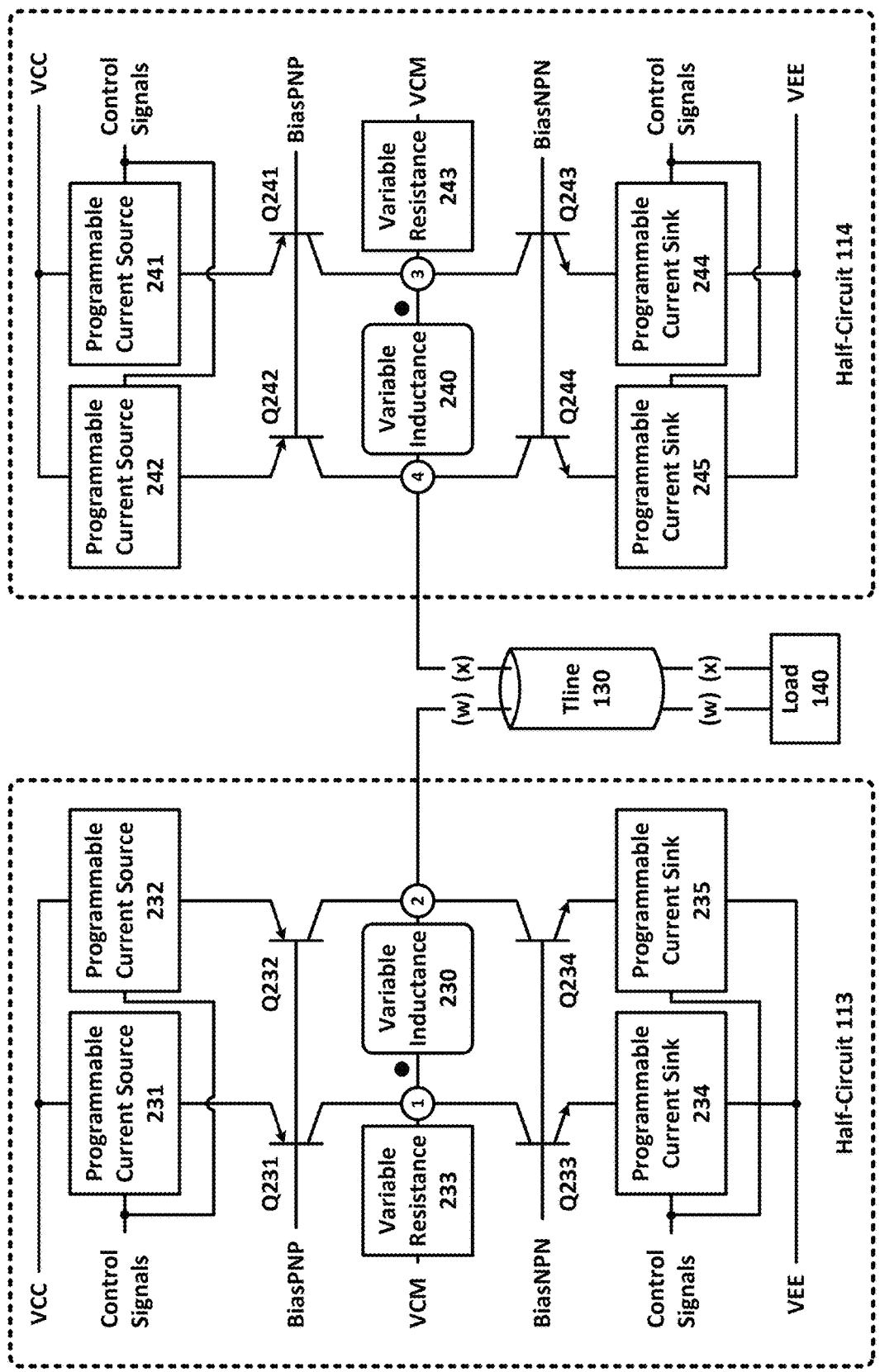
FIG. 2 illustrates an exemplary module, in accordance with one or more embodiments of the disclosure.

Referring to FIG. 2, module 110 is illustrated. Module 110 may be implemented as a pre-driver, a pre-amplifier, a pre-stage driver, a signal conditioner, an intermediate driver, and/or any other electronic circuitry that may condition or amplify current on lines (w) and (x). For example, module 110 may convert supply voltages VCC and VEE into current and deliver the current to load 140 on lines (w) and (x), as will be explained in detail. In various implementations, a typical voltage level for supply voltage VCC may happen to be +5V and a typical voltage level for supply voltage VEE may happen to be −3V. Module 110 may include controller 111 and pre-amp 112.

Controller 111 is electronic hardware implemented as any suitable processing circuitry. The processing circuitry may include, but not limited to at least one of a microcontroller, a microprocessor, a single processor, and a multiprocessor. Controller 111 may include at least one of an embedded controller (EC), a central processing unit (CPU), an accelerated processing unit (APU), an application specific integrated circuit (ASIC), field programmable gate arrays (FPGA), logic circuitry, a state machine, a programmable processor, or the like. Controller 111 may be implemented as electronic hardware that may include digital circuits, analog circuits or a combination of both digital and analog circuits. Analog circuits may include analog components that are suitable to process analog gate signals. Digital circuits may include switches and gates that are suitable to process digital gate signals.

Referring to FIG. 2, pre-amp 112 is illustrated. In the example of FIG. 2, pre-amp 112 may include half-circuits 113 and 114, which are symmetrical circuits. Half-circuit 113 may be referred to herein as a "first half-circuit" and half-circuit 114 may be referred to herein as a "second half-circuit." Also referred to herein, "symmetrical circuits"

are circuits where components and pathways are arranged in a mirror-like configuration on either side of load 140. Illustrated by example, half-circuit 113 may include several components such as variable inductance 230, biasing transistors Q231-Q234, programmable current sources 231-232, variable resistance 233 and programmable current sinks 234-235. Half-circuit 114 may include variable inductance 240, biasing transistors Q241-Q244, programmable current sources 241-242, variable resistance 243 and programmable current sinks 244-245. Variable inductance 230 may be referred to herein as a "first variable inductance" and variable inductance 240 may be referred to herein as a "second variable inductance." Those skilled in the art will appreciate that load 140 may be in series with half-circuits 113 and 114 with load 140 being between half-circuit 113 and half-circuit 114. Those skilled in the art will appreciate there may be additional components in pre-amp 112.

Illustrated in FIG. 2, variable inductances 230, 240 may each include a polarity dot that indicates a relative polarity of the voltages induced in variable inductances 230, 240. By way of illustration, positive terminal of variable inductances 230, 240 happen to be associated with a polarity dot. The polarity dot may define the polarity of variable inductances 230, 240. In particular, the polarity dot may indicate the direction of current flow through variable inductances 230, 240 relative to the magnetic field produced by variable inductances 230, 240.

A negative terminal of variable inductance 230 is electrically connected directly to line (w). A negative terminal of variable inductance 240 is electrically connected directly to line (x). Provided in series with load 140, variable inductances 230, 240 may provide impedance matching of impedance caused by the combination of tline 130 and load 140 over a broad frequency spectrum. As will be explained in detail, variable inductances 230, 240 may include one or more switchable inductors.

Referred to herein, a programmable current source is an electronic circuit that provides an adjustable amount of current to load 140. Half-circuit 113 may include programmable current sources 231-232. Half-circuit 114 may include programmable current sources 241-242. Control signals from controller 111 may regulate the amount of current that programmable current sources 231-232 and 241-242 may individually supply to load 140.

Referred to herein, a programmable current sink is an electronic circuit that may draw an adjustable amount of current from a current source. Half-circuit 113 may include programmable current sinks 234-235. Half-circuit 114 may include programmable current sinks 244-245. Control signals from controller 111 may regulate the amount of that programmable current sinks 234-235 and 244-245 may draw from programmable current sources 231-232 and 241-242.

Half-circuit 113 may include biasing transistors Q231-Q234. Half-circuit 114 may include biasing transistors Q241-Q244. Biasing transistors Q231-Q234 and Q241-Q244 are illustrated as bipolar transistors. However, those skilled in the art will appreciate that any of the biasing transistors Q231-Q234 and Q241-Q244 may be implemented as a Laterally-Diffused Metal-Oxide Semiconductor (LDMOS) transistor, a Field Effect Transistor (FET), a metal-oxide-semiconductor (PMOS) transistor and/or any other switching device. Controller 111 may output BiasPNP, which is a direct current (DC) static voltage, to the base of PNP biasing transistors Q231, Q232, Q241 and Q242. Controller 111 may output BiasNPN, which is another DC static voltage, to the base of NPN biasing transistors Q233, Q234, Q243 and Q244. Referred to herein, "DC static voltage" is a constant voltage.

Half-circuit 113 may include variable resistance 233 and half-circuit 114 may include variable resistance 243. Variable resistances 233 and 243 may each exist as a dynamically adjustable variable resistance. A variable resistance is an electrical resistance whose resistive value is adjustable. A dynamically adjustable variable resistance is an electrical resistance whose resistive value is adjustable electronically. Controller 111 may electronically adjust the resistive value variable resistances 233 and 243, individually and respectively. A user-defined setting may establish the resistive value for any of the variable resistances 233 and 243.

Being variably adjustable, variable resistances 233, 243 may individually regulate resistances in pre-amp 112. For example, variable resistance 233 may regulate a resistance that happens to appear at node 1. Variable resistance 243 may regulate a resistance that happens to appear at node 3. Variable resistances 233, 243 may each receive a signal VCM. Signal VCM is a DC voltage set at half way between supply voltages VCC and VEE in some instances.

Pre-amp 112 may exist as an H-bridge. An H-bridge is an electronic circuit that enables current to be applied through load 140 in either direction. Load 140 is connected between the two "legs" of the H-bridge. With programmable current sources 231-232 and 241-242, programmable current sinks 234-235 and 244-245, and biasing transistors Q231-Q234 and Q241-Q244 as the four legs of the letter "H," controller 111 may output control signals that regulate a flow of current through load 140 in a forward direction and a reverse direction on lines (w) and (x) so that current may be applied in either direction through load 140. In some instances, the forward direction may be a flow direction and the reverse direction may be a direction opposite to flow direction. In other instances, the reverse direction may be the flow direction and the forward direction may be the direction opposite to flow direction.

In cases where controller 111 may control current through load 140 flow in a forward direction, controller 111 may output control signals that activate programmable current sources 231-232 in tandem with activating programmable current sinks 244-245. In this the configuration, current from programmable current source 231 may flow onto line (w) of tline 130 through biasing transistors Q231 and variable inductance 230. Current from programmable current source 232 may flow onto line (w) of tline 130 through biasing transistors Q232. Current from programmable current source 231 may combine with current from programmable current source 232 at node 2. Node 2 may be a connection terminal for half-circuit 113. The connection terminal for half-circuit 113 may be referred to herein as a first connection terminal. Current may flow in the forward direction onto line (w) of tline 130 from node 2 and into load 140. Current may flow in the forward direction into node 4 from load 140 through line (x) of tline 130. Node 4 may be a connection terminal for half-circuit 114. The connection terminal for half-circuit 114 may be referred to herein as a second connection terminal. A portion of the current flowing through node 4 in the forward direction may flow to programmable current sink 244 through variable inductance 240 and biasing transistor Q243. Another portion of the current flowing through node 4 in the forward direction may flow through biasing transistor Q244 to programmable current sink 245.

In cases where controller 111 may control current through load 140 flow in a reverse direction, controller 111 may output control signals that activate programmable current sources 241-242 in tandem with activating programmable current sinks 234-235. In this the configuration, current from programmable current source 241 may flow onto line (x) of tline 130 through biasing transistors Q241 and variable inductance 240. Current from programmable current source 242 may flow onto line (x) of tline 130 through biasing transistors Q242. Current from programmable current source 241 may combine with current from programmable current source 242 at node 4. Current may flow in the reverse direction onto line (x) of tline 130 from node 4 and into load 140. Current may flow in the reverse direction into node 2 from load 140 through line (w) of tline 130. A portion of the current flowing through node 2 in the reverse direction may flow to programmable current sink 234 through variable inductance 230 and biasing transistor Q233. Another portion of the current flowing through node 2 in the reverse direction may flow through biasing transistor Q234 to programmable current sink 235.

Figure 3:
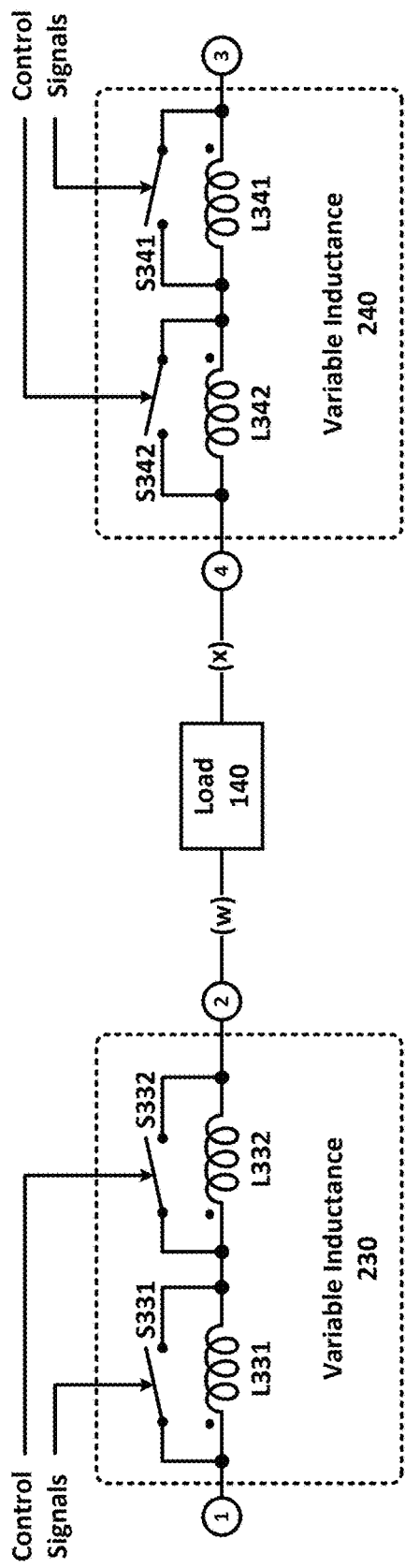
FIG. 3 illustrates exemplary variable inductances, in accordance with one or more embodiments of the disclosure.

Referring to FIG. 3, implementations of variable inductances 230 and 240 are illustrated. Variable inductance 230 is illustrated as the combination of inductors L331, L332 and switches S331, S332. Inductor L331 may include a polarity dot that indicates a relative polarity of the voltages induced in inductor L331. By way of illustration, positive terminal of inductor L331 happens to be associated with a polarity dot. The polarity dot may define the polarity of inductor L331. Controller 111 may output control signals that may cause the opening and closure of switch S331. Opening switch S331 may allow for current to flow through inductor L331. Closure of switch S331 may electrically connect the positive terminal of inductor L331 directly to the negative terminal of inductor L331 so as to result in a conductive short across inductor L331.

Inductor L332 may include a polarity dot that indicates a relative polarity of the voltages induced in inductor L332. By way of illustration, positive terminal of inductor L332 happens to be associated with a polarity dot. The polarity dot may define the polarity of inductor L332. Controller 111 may output control signals that may cause the opening and closure of switch S332. Opening switch S332 may allow for current to flow through inductor L332. Closure of switch S332 may electrically connect the positive terminal of inductor L332 directly to the negative terminal of inductor L332 so as to result in a conductive short across inductor L332.

Variable inductance 240 is illustrated as the combination of inductors L341, L342 and switches S341, S342. Inductor L341 may include a polarity dot that indicates a relative polarity of the voltages induced in inductor L341. By way of illustration, positive terminal of inductor L341 happens to be associated with a polarity dot. The polarity dot may define the polarity of inductor L341. Controller 111 may output control signals that may cause the opening and closure of switch S341. Opening switch S341 may allow for current to flow through inductor L341. Closure of switch S341 may electrically connect the positive terminal of inductor L341 directly to the negative terminal of inductor L341 so as to result in a conductive short across inductor L341.

Inductor L342 may include a polarity dot that indicates a relative polarity of the voltages induced in inductor L342. By way of illustration, positive terminal of inductor L342 happens to be associated with a polarity dot. The polarity dot may define the polarity of inductor L342. Controller 111 may output control signals that may cause the opening and closure of switch S342. Opening switch S342 may allow for current to flow through inductor L342. Closure of switch S342 may electrically connect the positive terminal of inductor L342 directly to the negative terminal of inductor L342 so as to result in a conductive short across inductor L342.

Figure 4:
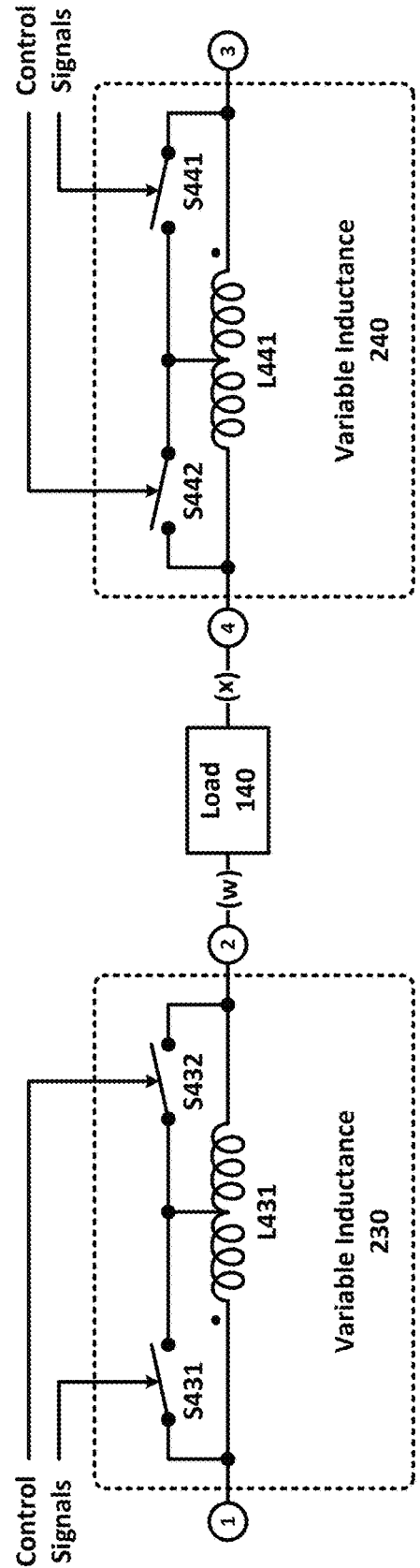
FIG. 4 illustrates exemplary variable inductances, in accordance with one or more embodiments of the disclosure.

Referring to FIG. 4, variable inductances 230, 240 are illustrated. In order to minimize the area of inductors L341, L441 in an integrated circuit chip, inductors L341, L441 may each be a single coil with a center tap as illustrated in the example of FIG. 4. Variable inductance 230 may exist as the combination of switches S431, S432 and inductor L431. Inductor L431 may include a polarity dot that indicates a relative polarity of the voltages induced in inductor L431. The polarity dot may define the polarity of inductor L431. By way of illustration, positive terminal of inductor L431 happens to be associated with a polarity dot. Controller 111 may output control signals that cause the opening and closure of switches S431 and S432. Opening switch S431 may allow for current to flow through a portion of inductor L431. Opening switch S432 may allow for current to flow through another portion of inductor L431. Closure of switch S431 may electrically connect the positive terminal of inductor L431 directly to the center tap of inductor L431 so as to result in a conductive short across the portion of inductor L431. Closure of switch S432 may electrically connect the center tap of inductor L431 directly to the negative terminal of inductor L431 so as to result in a conductive short across another portion of inductor L431.

Variable inductance 240 may exist as the combination of switches S441, S442 and inductor L441. Inductor L441 may include a polarity dot that indicates a relative polarity of the voltages induced in inductor L441. The polarity dot may define the polarity of inductor L441. By way of illustration, positive terminal of inductor L441 happens to be associated with a polarity dot. Controller 111 may output control signals that cause the opening and closure of switches S441 and S442. Opening switch S441 may allow for current to flow through a portion of inductor L441. Opening switch S442 may allow for current to flow through another portion of inductor L441. Closure of switch S441 may electrically connect the positive terminal of inductor L441 directly to the center tap of inductor L441 so as to result in a conductive short across the portion of inductor L441. Closure of switch S442 may electrically connect the center tap of inductor L441 directly to the negative terminal of inductor L441 so as to result in a conductive short across another portion of inductor L441.

Figure 5:
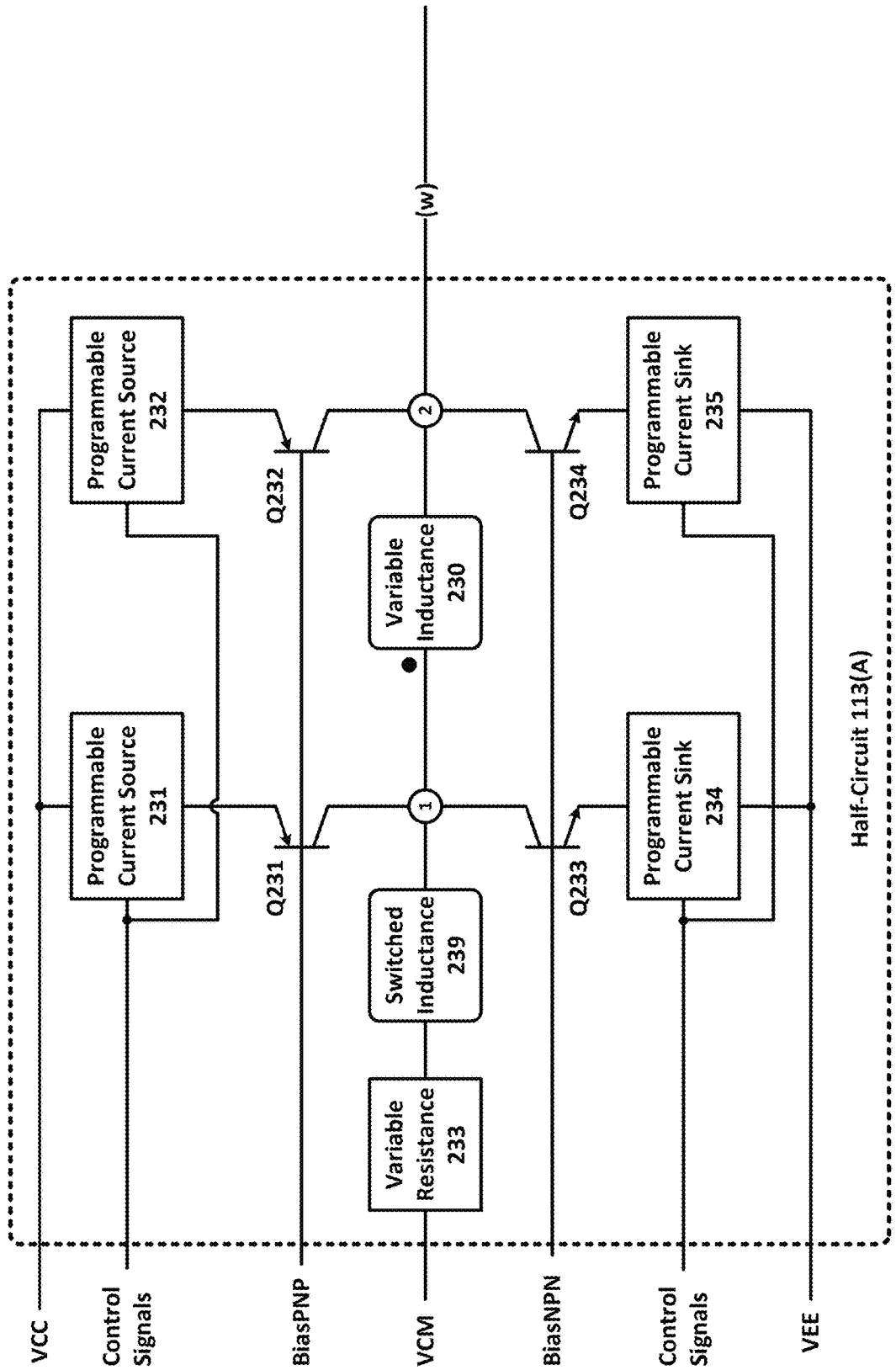
FIG. 5 illustrates an exemplary half-circuit, in accordance with one or more embodiments of the disclosure.
Figure 6:
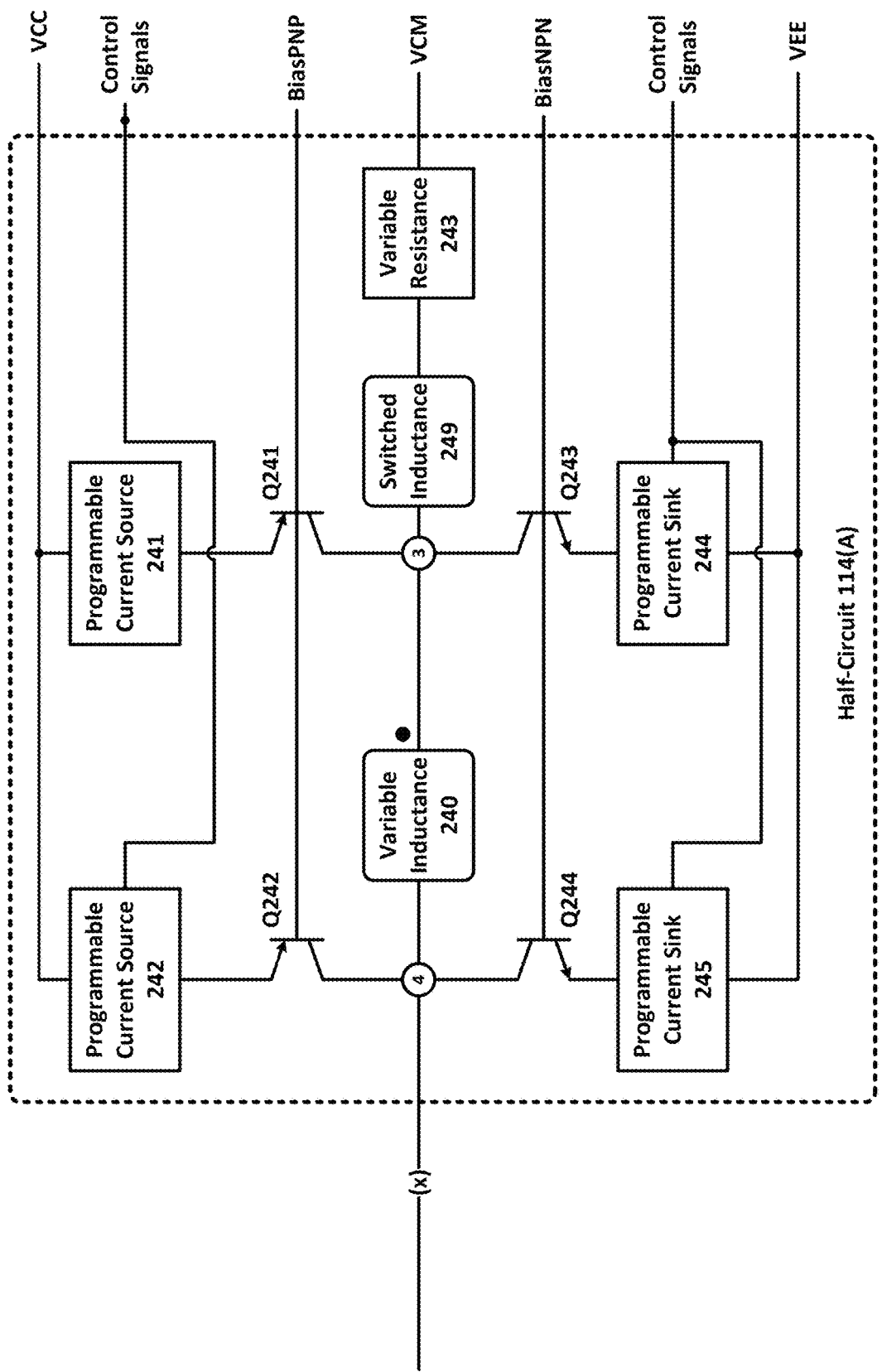
FIG. 6 illustrates an exemplary half-circuit, in accordance with one or more embodiments of the disclosure.
Figure 7:
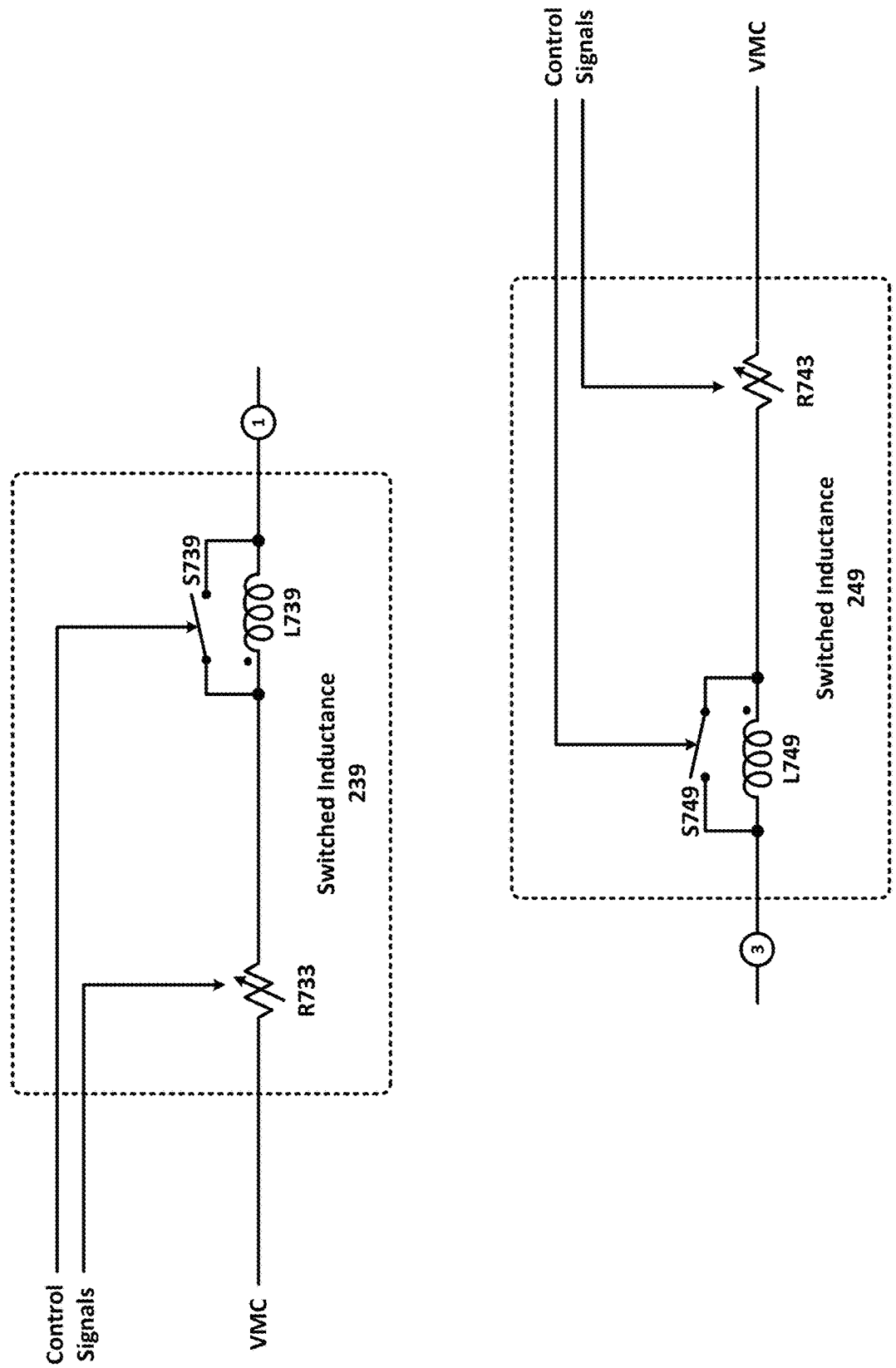
FIG. 7 illustrates an exemplary assembly, in accordance with one or more embodiments of the disclosure.

Referring to FIGS. 5 and 6, illustrated are half-circuit 113(A) and half-circuit 114(A). In addition to the components of half-circuits 113, 114 in the example of FIG. 2, half-circuit 113(A) may include switched inductance 239 and half-circuit 114(A) may include switched inductance 249. Illustrated in FIG. 7 are variable resistance R733 and switch S739 in parallel with inductor L739. The combination of switch S739 and inductor L739 is in series with variable resistance R733. Variable resistance R733 may exist as a dynamically adjustable variable resistance. Inductor L739 may include a polarity dot that indicates a relative polarity of the voltages induced in inductor L739. By way of illustration, positive terminal of inductor L739 happens to be associated with a polarity dot. The polarity dot may define the polarity of inductor L739. Controller 111 may output control signals that may cause the opening and closure of switch S739. Opening switch S739 may allow for current to flow through inductor L739. Closure of switch S739 may electrically connect the positive terminal of inductor L739 directly to the negative terminal of inductor L739 so as to result in a conductive short across inductor L739.

Also illustrated in FIG. 7 are variable resistance R743 and switch S749 in parallel with inductor L749. The combination of switch S749 and inductor L749 is in series with variable resistance R743. Variable resistance R743 may exist as a dynamically adjustable variable resistance. Inductor L749 may include a polarity dot that indicates a relative polarity of the voltages induced in inductor L749. By way of illustration, positive terminal of inductor L749 happens to be associated with a polarity dot. The polarity dot may define the polarity of inductor L749. Controller 111 may output control signals that may cause the opening and closure of switch S749. Opening switch S749 may allow for current to flow through inductor L749. Closure of switch S749 may electrically connect the positive terminal of inductor L749 directly to the negative terminal of inductor L749 so as to result in a conductive short across inductor L749.

Figure 8:
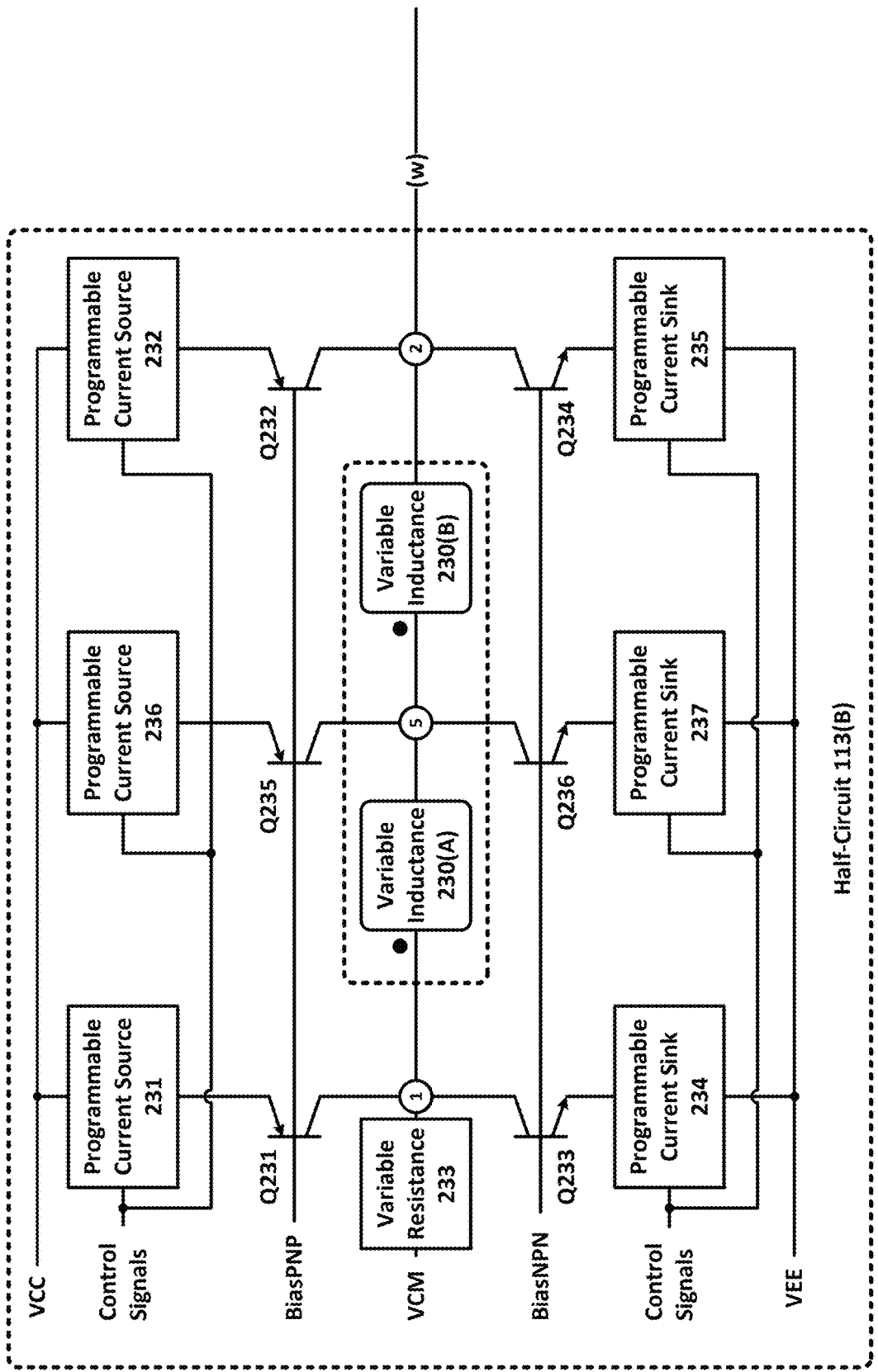
FIG. 8 illustrates an exemplary half-circuit, in accordance with one or more embodiments of the disclosure.
Figure 9:
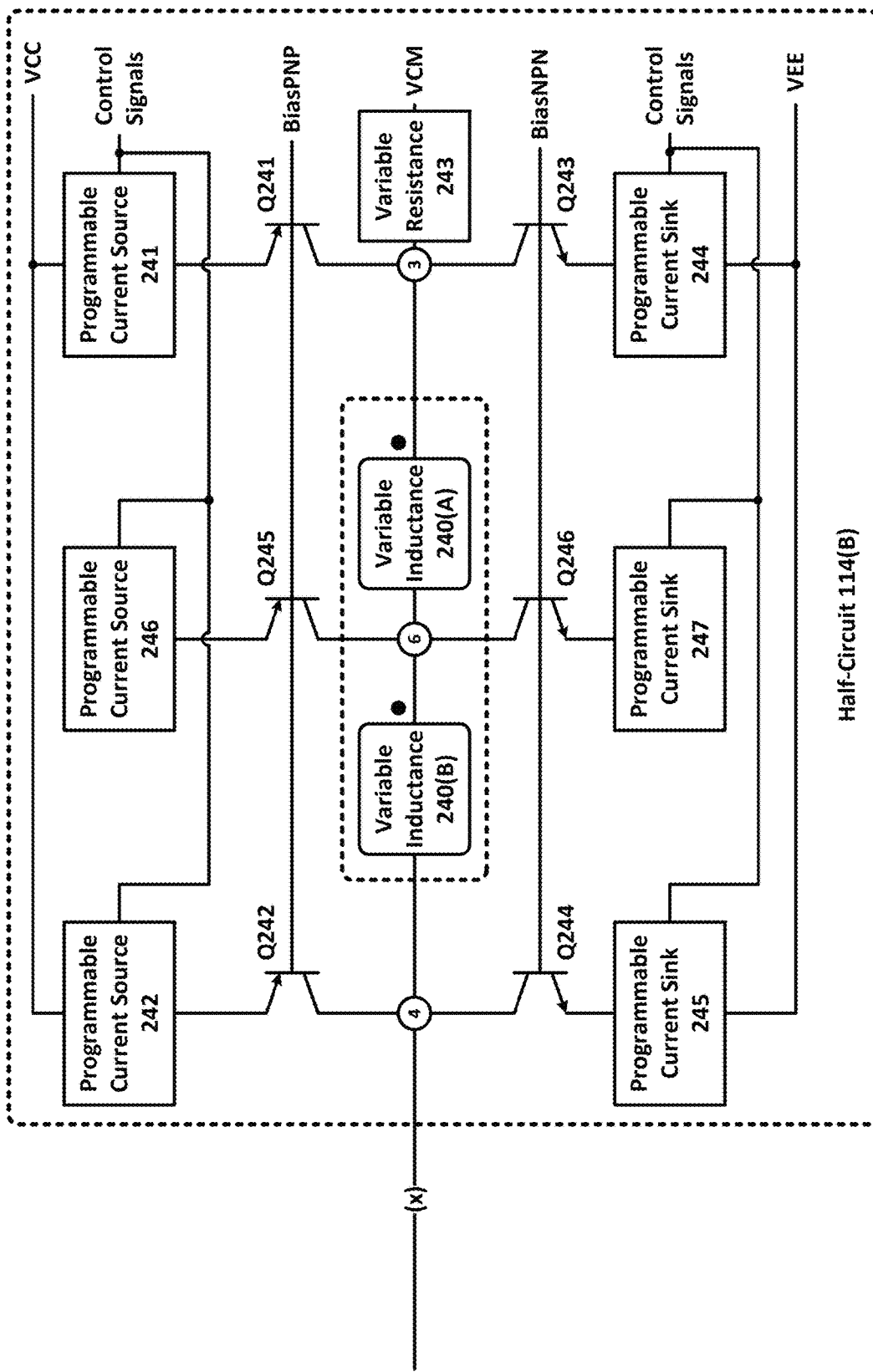
FIG. 9 illustrates an exemplary half-circuit, in accordance with one or more embodiments of the disclosure.

Referring to FIGS. 8, 9 and 10, illustrated are half-circuit 113(B) and half-circuit 114(B). In addition to the components of half-circuits 113, 114 in the example of FIG. 2, half-circuit 113(B) may include programmable current source 236 and programmable current sink 237. Variable inductance 230 in FIG. 8 may exist in the form of variable inductances 230(A) and 230(B). For example, variable inductance 230(A) may exist in FIG. 10 as the combination of switch S831 and inductor L831. Variable inductance 230(B) may exist in FIG. 10 as the combination of switch S832 and inductor L832. Variable inductance 240 in FIG. 9 may exist in the form of variable inductances 240(A) and 240(B). For example, variable inductance 240(A) may exist in FIG. 10 as the combination of switch S931 and inductor L931. Variable inductance 240(B) may exist in FIG. 10 as the combination of switch S932 and inductor L932.

Referring to FIG. 11, switch S(X) is illustrated. Any switch existing in pre-amp 112 may be configured as switch S(X). A control signal from controller 111 is a current that may regulate the opening and closure of switch S(X). Switch S(X) may include transistor Q0 and resistors R0, R1. Resistors R0, R1 are of a same ohmic value.

Those skilled in the art will also appreciate the arrangement or interconnection of components such as "coupled," "connected," "on," "under," or similar wording allows for indirect connections, or intervening components or layers.

Certain operations of methods according to the technology, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, may be executed in different orders than are expressly illustrated or described, as appropriate for particular examples of the technology. Further, in some examples, certain operations may be executed in parallel or partially in parallel, including by dedicated parallel processing devices, or separate computing devices configured to interoperate as part of a large system.

As used herein, unless otherwise limited or defined, "or" indicates a non-exclusive list of components or operations that may be present in any variety of combinations, rather than an exclusive list of components that may be present only as alternatives to each other. For example, a list of "A, B, or C" indicates options of: A; B; C; A and B; A and C; B and C; and A, B, and C.

Correspondingly, the term "or" as used herein is intended to indicate exclusive alternatives only when preceded by terms of exclusivity, such as, e.g., "either," "only one of," or "exactly one of." Further, a list preceded by "one or more" (and variations thereon) and including "or" to separate listed elements indicates options of one or more of any or all of the listed elements.

For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C.

Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

In general, the term "or" as used herein only indicates exclusive alternatives (e.g., "one or the other but not both") when preceded by terms of exclusivity, such as, e.g., "either," "only one of," or "exactly one of."

Any mark, if referenced herein, may be common law or registered trademarks of third parties affiliated or unaffiliated with the applicant or the assignee. Use of these marks is by way of example and shall not be construed as descriptive or to limit the scope of disclosed or claimed embodiments to material associated only with such marks.

The articles "a," "an," and "the" are intended to include the plural forms as well, unless the context clearly indicates otherwise.

The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the application, ordinal numbers (e.g., first, second, third, etc.) may be used as an adjective for an element (i.e., any noun in the application).

Although terms such as "first," "second," and "third" may be used herein to describe various members, components, regions, layers, or sections, these members, components, regions, layers, or sections are not to be limited by these terms.

Rather, these terms are only used to distinguish one member, component, region, layer, or section from another member, component, region, layer, or section.

The use of ordinal numbers is not to imply or create any particular ordering of the elements nor to limit any element to being only a single element unless expressly disclosed, such as by the use of the terms "before," "after," "single," and other such terminology.

Rather, the use of ordinal numbers is to distinguish between the elements.

By way of an example, a first element is distinct from a second element, and the first element may encompass more than one element and succeed (or precede) the second element in an ordering of elements.

Thus, a first member, component, region, layer, or section referred to in examples described herein may also be referred to as a second member, component, region, layer, or section without departing from the teachings of the examples.

What is claimed is:

1. A module comprising:
    a first variable inductance electrically connected to a pair of nodes in a first half-circuit, one of the nodes in the first half-circuit being a first connection terminal; and
    a second variable inductance electrically connected to a pair of nodes in a second half-circuit, one of the nodes in the second half-circuit being a second connection terminal,
        wherein the first half-circuit is configured to receive, from a load through the first connection terminal, a flow of current in response to the second half-circuit supplying the current to the load in a flow direction,
        wherein the second half-circuit is configured to receive, from the load through the second connection terminal, the flow of the current in response to the first half-circuit supplying the current to the load in a direction opposite to the flow direction.

2. The module according to claim 1, wherein the load is a read/write head in a hard disc drive.

3. The module according to claim 1, wherein the first connection terminal and the second connection terminal are configured to electrically connect the load between the first connection terminal and the second connection terminal.

4. The module according to claim 1, wherein the first connection terminal and the second connection terminal are configured to electrically connect the load in series with the first connection terminal and the second connection terminal.

5. The module according to claim 1, wherein the first variable inductance is electrically connected directly to the first connection terminal.

6. The module according to claim 1, wherein the first variable inductance is between the pair of nodes in the first half-circuit.

7. The module according to claim 1, wherein the second variable inductance is electrically connected directly to the second connection terminal.

8. The module according to claim 1, wherein the second variable inductance is between the pair of nodes in the second half-circuit.

9. The module according to claim 1, wherein the module comprises the first half-circuit.

10. The module according to claim 1, wherein the first half-circuit comprises the first variable inductance.

11. The module according to claim 1, wherein the module comprises the second half-circuit.

12. The module according to claim 1, wherein the second half-circuit comprises the second variable inductance.

13. The module according to claim 1, wherein the first variable inductance comprises an inductor in parallel with a switch.

14. The module according to claim 13, wherein the switch and another switch are electrically connected to a center tap of the inductor.

15. The module according to claim 1, wherein the second variable inductance comprises an inductor in parallel with a switch.

16. The module according to claim 15, wherein the switch and another switch are electrically connected to a center tap of the inductor.

17. The module according to claim 1, wherein the first half-circuit comprises:
    a current source configured to supply a portion of the current to the first connection terminal.

18. The module according to claim 17, wherein the first half-circuit further comprises:
    another current source configured to supply another portion of the current to another of the nodes in the first half-circuit.

19. The module according to claim 17, wherein the second half-circuit comprises:
    a current source configured to supply a portion of the current to the second connection terminal.

20. The module according to claim 19, wherein the second half-circuit further comprises:
    another current source configured to supply another portion of the current to another of the nodes in the second half-circuit.

* * * * *